United States Patent
Yoshimine et al.

(10) Patent No.: US 11,193,528 B2
(45) Date of Patent: Dec. 7, 2021

(54) BEARING PAD FOR TILTING-PAD BEARING, TILTING-PAD BEARING, AND ROTARY MACHINE

(71) Applicant: MITSUBISHI HEAVY INDUSTRIES, LTD., Tokyo (JP)

(72) Inventors: Chihiro Yoshimine, Tokyo (JP); Tanehiro Shinohara, Tokyo (JP); Tadasuke Nishioka, Tokyo (JP); Shimpei Yokoyama, Tokyo (JP); Takuzo Shigihara, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 58 days.

(21) Appl. No.: 16/494,434

(22) PCT Filed: Feb. 1, 2018

(86) PCT No.: PCT/JP2018/003378
§ 371 (c)(1),
(2) Date: Sep. 16, 2019

(87) PCT Pub. No.: WO2018/173502
PCT Pub. Date: Sep. 27, 2018

(65) Prior Publication Data
US 2020/0392986 A1   Dec. 17, 2020

(30) Foreign Application Priority Data
Mar. 24, 2017 (JP) .............................. JP2017-058334

(51) Int. Cl.
*F16C 17/03* (2006.01)
*F16C 17/06* (2006.01)

(52) U.S. Cl.
CPC .............. *F16C 17/03* (2013.01); *F16C 17/06* (2013.01); *F16C 2360/23* (2013.01);
(Continued)

(58) Field of Classification Search
CPC ........ F16C 17/03; F16C 17/035; F16C 17/06; F16C 17/065
See application file for complete search history.

(56) References Cited

U.S. PATENT DOCUMENTS 3,687,510 A   8/1972 Cooper
4,533,262 A * 8/1985 Pedersen ................. F16C 17/06
384/420

(Continued)

FOREIGN PATENT DOCUMENTS

DE   2154217        10/1971
GB   1 304 800      1/1973

(Continued)

OTHER PUBLICATIONS

International Search Report dated Apr. 24, 2018 in International (PCT) Application No. PCT/JP2018/003378 with English translation.

(Continued)

*Primary Examiner* — James Pilkington
(74) *Attorney, Agent, or Firm* — Wenderoth, Lind & Ponack, L.L.P.

(57) ABSTRACT

A bearing pad for a tilting-pad bearing includes a first member having a bearing surface and a second member disposed on a back surface side of the first member. At least one of a back surface of the first member or a front surface of the second member facing the back surface of the first member has a recess for forming a cavity between the first member and the second member. Preferably, the bearing pad further includes a support member disposed on a back surface side of the second member and tiltably supporting the first member and the second member, and the recess is formed over at least a part of an installation range of the support member in a plan view of the bearing pad.

6 Claims, 7 Drawing Sheets

(52) U.S. Cl.
CPC ...... *F16C 2360/24* (2013.01); *F16C 2360/31* (2013.01); *F16C 2380/26* (2013.01)

(56) References Cited

U.S. PATENT DOCUMENTS

| | | | | |
|---|---|---|---|---|
| 4,636,095 | A | * | 1/1987 | Gerling .................. F16C 17/03 384/114 |
| 4,686,403 | A | * | 8/1987 | Hackstie ................ F16C 17/03 384/310 |
| 5,518,321 | A | * | 5/1996 | Hata ...................... F16C 17/03 384/311 |
| 8,123,409 | B2 | | 2/2012 | Waki et al. |
| 2010/0220944 | A1 | | 9/2010 | Waki et al. |

FOREIGN PATENT DOCUMENTS

| | | |
|---|---|---|
| JP | 44-25364 | 10/1969 |
| JP | 49-1771 | 5/1974 |
| JP | 49-017717 | 5/1974 |
| JP | 58-9525 | 1/1983 |
| JP | 58-30523 | 2/1983 |
| JP | 59-147114 | 8/1984 |
| JP | 59-180116 | 10/1984 |
| JP | 60-37698 | 3/1985 |
| JP | 60-88119 | 6/1985 |
| JP | 10-288220 | 10/1998 |
| JP | 2001-124062 | 5/2001 |
| JP | 2001-165152 | 6/2001 |
| JP | 2010-203481 | 9/2010 |
| JP | 4764486 | 9/2011 |
| JP | 2013-234746 | 11/2013 |
| JP | 2016-142313 | 8/2016 |

OTHER PUBLICATIONS

International Preliminary Report on Patentability dated Oct. 3, 2019 in International (PCT) Application No. PCT/JP2018/003378 with English translation.
Notice of Reasons for Refusal dated Jul. 7, 2020 in corresponding Japanese Patent Application No. 2017-058334, with English Translation.
German Office Action dated Apr. 1, 2020 in counterpart DE Application No. 112018001578.5 with Machine Translation.
Office Action dated Apr. 9, 2020 in corresponding Chinese Application No. 201880019122.1 with English language Machine Translation.
Notice of Reasons for Refusal dated Mar. 2, 2021 in Japanese Patent Application No. 2017-058334, with English Translation.

* cited by examiner

Circumferential direction

Circumferential direction

BEARING PAD FOR TILTING-PAD BEARING, TILTING-PAD BEARING, AND ROTARY MACHINE

TECHNICAL FIELD

The present disclosure relates to a bearing pad for a tilting-pad bearing, a tilting-pad bearing, and a rotary machine.

BACKGROUND ART

Generally, a rotary machine such as a steam turbine and a gas turbine includes a bearing device for rotatably supporting a rotor shaft. As the bearing device, a configuration in which at least the load direction of the rotor load is supported by tiltable bearing pads from one or more angular directions in the circumferential direction of the rotor shaft is known.

For instance, Patent Document 1 discloses a bearing device used as a journal bearing. In the bearing device disclosed in Patent Document 1, lubricant oil is supplied to a space between a rotor shaft and a bearing pad slidably supporting the rotor shaft to form an oil film, and the rotor shaft is supported via the oil film, thus preventing direct metal contact between the rotor shaft and the bearing pad.

CITATION LIST

Patent Literature

Patent Document 1: JP2010-203481A

SUMMARY

Problems to be Solved

In case of a configuration in which tilting of the bearing pad is achieved by a pivot disposed on a back surface side (opposite to the bearing surface) of the bearing pad, the bearing surface may have a portion with a locally higher surface pressure (local surface pressure) than the periphery. Therefore, at low-speed rotation by which an oil film with insufficient thickness is formed on the bearing surface, metal contact under a high load condition is locally caused around this portion, and the surface temperature of the bearing pad is increased by friction between the rotor shaft and the bearing surface. This can cause melting of the surface metal, so-called plastic flow.

In view of the above, an object of at least one embodiment of the present invention is to prevent plastic flow on the bearing surface of a tilting-pad bearing.

Solution to the Problems (1) A bearing pad for a tilting-pad bearing according to at least one embodiment of the present invention comprises: a first member having a bearing surface; and a second member disposed on a back surface side of the first member, and at least one of a back surface of the first member or a front surface of the second member facing the back surface of the first member has a recess for forming a cavity between the first member and the second member.

With the above configuration (1), a cavity is formed between the first member and the second member, which allows a portion of the first member adjacent to the cavity to bend and deform toward the second member, i.e., in a direction away from the rotor shaft when load is applied to the bearing surface. Thus, it is possible to suppress generation of a portion with higher local surface pressure than its periphery on the bearing surface. Further, even if the portion with high local surface pressure is generated on the bearing surface of the first member, it is possible to decrease a peak value of local surface pressure applied to the bearing surface. Accordingly, especially at low-speed rotation, it is possible to reduce the increase in temperature due to friction between the rotor shaft and the first member, and thus it is possible to prevent plastic flow on the bearing surface.

(2) In some embodiments, in the above configuration (1), the bearing pad further comprises a support member disposed on a back surface side of the second member and tiltably supporting the first member and the second member, and the recess is formed over at least a part of an installation range of the support member in a plan view of the bearing pad.

The tiltable bearing pad tends to have high local surface pressure in the installation range of the support member, i.e., a range where the back surface is supported by the support member. In this regard, with the above configuration (2), since the recess is formed over at least a part of the installation range of the support member in a plan view of the bearing pad, at least a part of the portion with high surface pressure on the bearing surface of the first member can bend in a direction away from the rotor shaft. Thus, it is possible to relieve the surface pressure and prevent generation of the portion with higher local surface pressure than its periphery on the bearing surface, or even if the portion with higher local surface pressure is generated, it is possible to decrease a peak value of the surface pressure. Accordingly, it is possible to reduce surface pressure applied to the bearing surface and prevent plastic flow on the bearing surface.

(3) In an embodiment, in the above configuration (2), the recess is formed over the entire installation range of the support member in a plan view of the bearing pad.

With the above configuration (3), in a plan view of the bearing pad, the recess formed over the entire installation range of the support member allows load applied to the bearing surface and the support member to be relieved more reliably, thus preventing generation of the portion with higher local surface pressure than its periphery on the bearing surface. Accordingly, it is possible to more reliably prevent plastic flow on the bearing surface of the first member.

(4) In some embodiments, in any one of the above configurations (1) to (3), the cavity communicates with an external space of the bearing pad.

With the above configuration (4), lubricant oil is accessible inside and outside the cavity formed by the recess. Thus, for instance, it is possible to give a damping function to the bearing pad with respect to shaft vibration input to the bearing pad or the like.

(5) In some embodiments, in any one of the above configurations (1) to (4), the tilting-pad bearing includes a bearing with direct lubrication including a nozzle for supplying lubricant oil to the bearing surface.

With the above configuration (5), it is possible to achieve the effect described in the above (1) in the tilting-pad bearing with direct lubrication.

(6) In some embodiments, in any one of the above configurations (1) to (5), the first member is made of copper or a copper alloy, and the second member is made of steel.

With the above configuration (6), while the recess reduces local surface pressure, the first member made of copper or a copper alloy improves heat dissipation performance and prevents thermal deformation, and the second member made of steel suppresses pressure deformation. Thus, it is possible to prevent generation of the portion with higher local surface pressure than its periphery on the bearing surface, or even if the portion with higher local surface pressure is generated, it is possible to decrease a peak value of the surface pressure. Further, since an allowable bearing load per oil film with the same thickness is increased at high-speed rotation with the increase in heat dissipation performance by copper, it is possible to downsize the bearing.

(7) A tilting-pad bearing according to at least one embodiment of the present invention comprises: the bearing pad described in any one of the above (1) to (6); and a carrier ring disposed on an outer peripheral side of the at least one bearing pad and configured to hold the at least one bearing pad.

With the above configuration (7), it is possible to obtain the tilting-pad bearing with the carrier ring supporting the bearing pad capable of suppressing plastic flow.

(8) A tilting-pad bearing according to at least one embodiment of the present invention comprises: at least one bearing pad; and a carrier ring disposed on an outer peripheral side of the at least one bearing pad and configured to hold the at least one bearing pad. The or each bearing pad includes: a first member having a bearing surface and made of copper or a copper alloy; and a second member disposed on a back surface side of the first member and made of steel, and the carrier ring includes at least one oil-supply nozzle for supplying lubricant oil to the bearing surface.

With the above configuration (8), the first member made of copper or a copper alloy improves heat dissipation performance of the bearing pad and prevents thermal deformation, and the second member made of steel improves stiffness of the bearing pad and suppresses pressure deformation. Accordingly, it is possible to reduce local surface pressure acting on the bearing surface and prevent plastic flow on the bearing surface at low-speed rotation. Further, since an allowable bearing load per oil film with the same thickness is increased at high-speed rotation with the increase in heat dissipation performance by the first member made of copper or a copper alloy, it is possible to downsize the bearing.

(9) A rotary machine according to at least one embodiment of the present invention comprises: the tilting-pad bearing described in the above (7) or (8); and a rotor shaft rotatably supported by the tilting-pad bearing.

With the above configuration (9), it is possible to obtain the rotary machine with the rotor shaft supported by the tilting-pad bearing capable of preventing damage.

Advantageous Effects

According to at least one embodiment of the present invention, it is possible to prevent damage to a tilting-pad bearing.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First Embodiment

Figure 1:
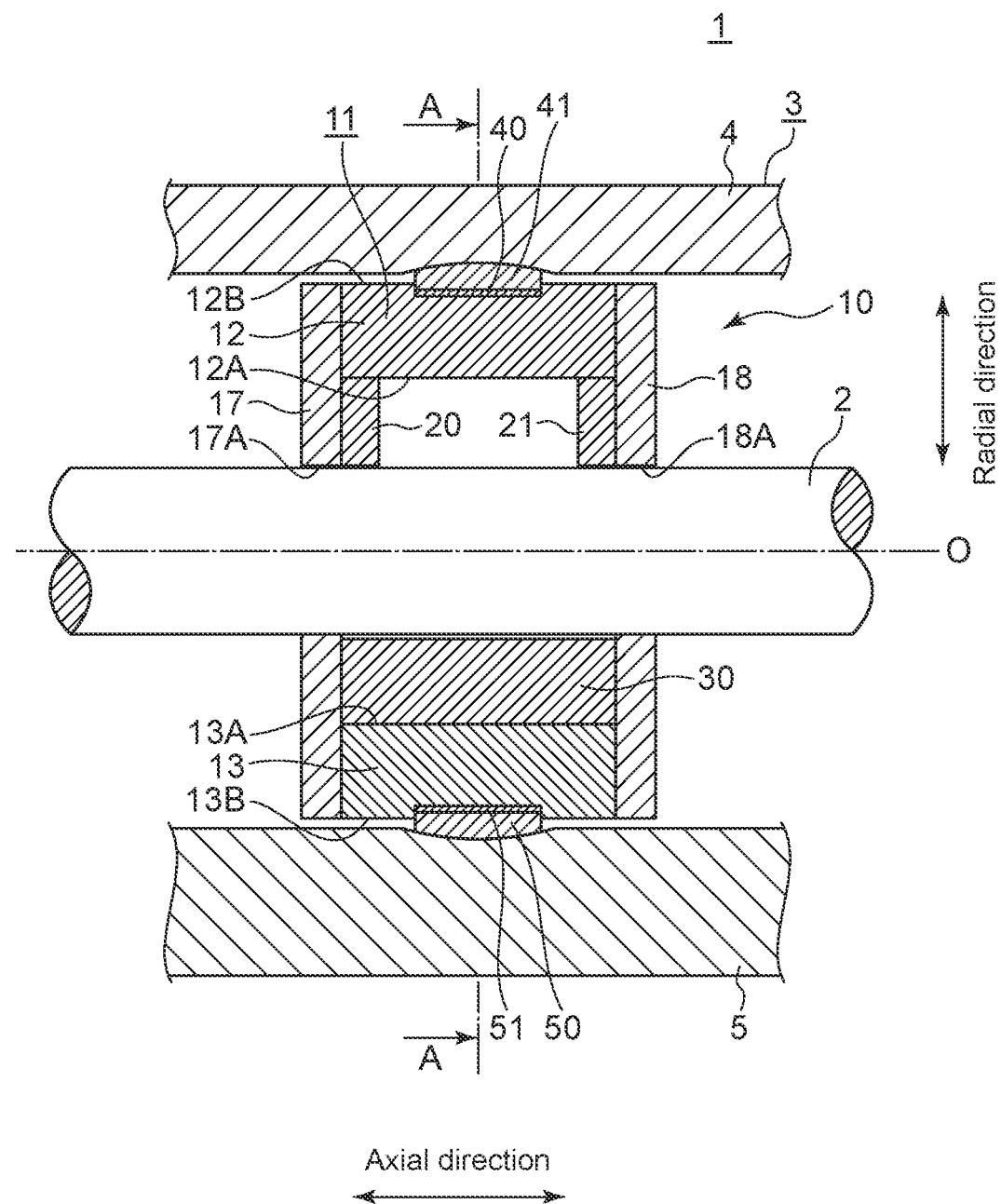
FIG. 1 is a cross-sectional view of a tilting-pad bearing according to an embodiment, taken along the axial direction.
Figure 2:
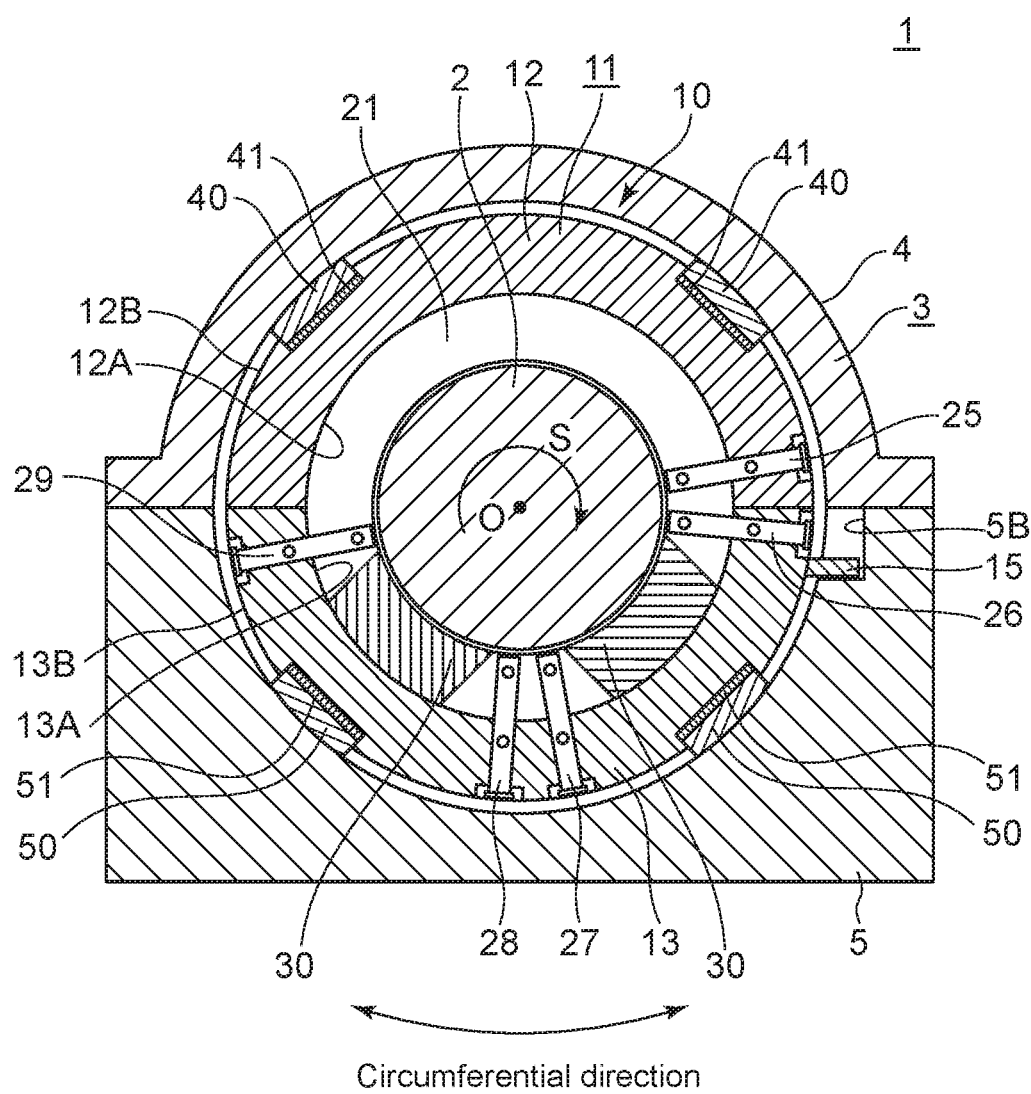
FIG. 2 is a cross-sectional view taken along line A-A in FIG. 1.

FIG. 1 is a cross-sectional view of a tilting-pad bearing 10 according to an embodiment, taken along the axial direction. FIG. 2 is a cross-sectional view taken along line A-A in FIG. 1 perpendicular to the axial direction. In the present embodiment, "axial direction" refers to the direction of a center axis 0 of a rotor shaft 2 supported by the tilting-pad bearing 10, and "radial direction" refers to the radial direction of the rotor shaft 2, and "circumferential direction" refers to the circumferential direction of the rotor shaft 2.

First, the overall configuration of a rotary machine 1 to which the tilting-pad bearing 10 according to some embodiments is applied will be described. Then, configurations of the tilting-pad bearing 10 and a bearing pad 30 will be described in detail.

The rotary machine 1 according to some embodiments may be a turbine such as a gas turbine, a steam turbine (e.g., steam turbine of nuclear power plant), and a machine-driving turbine, a wind power machine such as a wind turbine generator, or a supercharger.

The rotary machine 1 according to an embodiment may include the tilting-pad bearing (journal bearing) 10 as a bearing device, a rotor shaft 2 rotatably supported by the tilting-pad bearing 10, and a bearing housing 3 accommodating the rotor shaft 2 and the tilting-pad bearing 10. The bearing housing 3 may include an upper half bearing housing 4 and a lower half bearing housing 5, and the upper half bearing housing 4 and the lower half bearing housing 5 may have inner peripheral surfaces each having a semicircular cross section in a direction perpendicular to the axial direction (see FIG. 2).

The lubrication method (oil supply method) of the tilting-pad bearing 10 is not limited to a particular method. For instance, a direct lubrication method may be adopted. However, the tilting-pad bearing 10 according to another embodiment may be a thrust bearing, or an oil bath lubrication method or other lubricant methods may be adopted. Furthermore, in another embodiment, another one or more bearing pads 30 may be disposed in the upper half region, or three or more bearing pads 30 may be disposed in the lower half region.

As shown in FIGS. 1 and 2, the tilting-pad bearing 10 according to some embodiments may include at least one bearing pad 30 as a bearing, and a carrier ring 11 disposed on the outer peripheral side of the bearing pad 30 and configured to hold the at least one bearing pad 30. In some embodiments, the tilting-pad bearing 10 may have two bearing pads 30 in the lower half region.

As shown in FIGS. 1 and 2, the carrier ring 11 may include an upper half carrier ring 12 and a lower half carrier ring 13. The upper half carrier ring 12 and the lower half carrier ring 13 may include inner peripheral surfaces 12A, 13A and outer peripheral surfaces 12B, 13B, respectively, each of which has a semicircular cross-section perpendicular to the axial direction (see FIG. 2). Alternatively, in some embodiments, the carrier ring 11 may have an integral structure.

As shown in FIG. 1, on both ends of the carrier ring 11 with respect to the axial direction, a pair of side plates 17, 18 is disposed along the outer periphery of the rotor shaft 2. The side plates 17, 18 are formed in a disc shape and have holes 17A, 18A in the middle for receiving the rotor shaft 2. These side plates 17, 18 suppress outward leakage of lubricant oil to a suitable extent.

The inner peripheral surface 12A of the upper half carrier ring 12 is provided with guide metals (half-ring bearings) 20, 21 mainly to suppress backlash of the rotor shaft 2 from above. For instance, as shown in FIG. 1, a pair of guide metals 20, 21 is mounted on both sides of the upper half carrier ring 12 in the axial direction, inside the side plates 17, 18 in the axial direction.

In some embodiments, the carrier ring 11 of the tilting-pad bearing 10 may be provided with at least one oil-supply nozzle 25 to 29 for supplying lubricant oil to a bearing surface 30A (see FIG. 2).

In the example shown in FIG. 2, in a case where the rotor shaft 2 rotates clockwise as indicated by the arrow S in the figure, five oil-supply nozzles, including the first oil-supply nozzle 25, the second oil-supply nozzle 26, the third oil-supply nozzle 27, the fourth oil-supply nozzle 28, and the fifth oil-supply nozzle 29, are disposed from the upstream side with respect to the rotational direction S of the rotor shaft 2. The arrangement of the oil-supply nozzle is not limited thereto.

A lubricant-oil supply channel (not shown) may be formed inside the carrier ring 11. Lubricant oil supplied to the lubricant-oil supply channel is sent to each of the oil-supply nozzles 25 to 29, and is injected from each of the oil-supply nozzles 25 to 29 to the vicinity of the bearing pad 30.

Between the upper half carrier ring 12 and the upper half bearing housing 4, at least one upper key 40 and at least one upper shim 41 may be disposed. Similarly, between the lower half carrier ring 13 and the lower half bearing housing 5, at least one lower key 50 and at least one lower shim 51 may be disposed.

The outer peripheral surface 13B of the carrier ring 11 may have an anti-rotation projection 15 protruding radially outward. The anti-rotation projection 15 is disposed on an upstream end of the lower half carrier ring 13 with respect to the rotational direction S of the rotor shaft 2. On the other hand, the lower half bearing housing 5 may have an anti-rotation recess 5B. The anti-rotation recess 5B is disposed on an upstream end of the lower half bearing housing 5 with respect to the rotational direction S of the rotor shaft 2 so as to correspond to the anti-rotation projection 15. Thus, by engaging the anti-rotation projection 15 with the anti-rotation recess 5B, it is possible to prevent the carrier ring 11 from rotating together with the rotor shaft 2.

Next, the bearing pad 30 according to the first embodiment will be described specifically.

Figure 3:
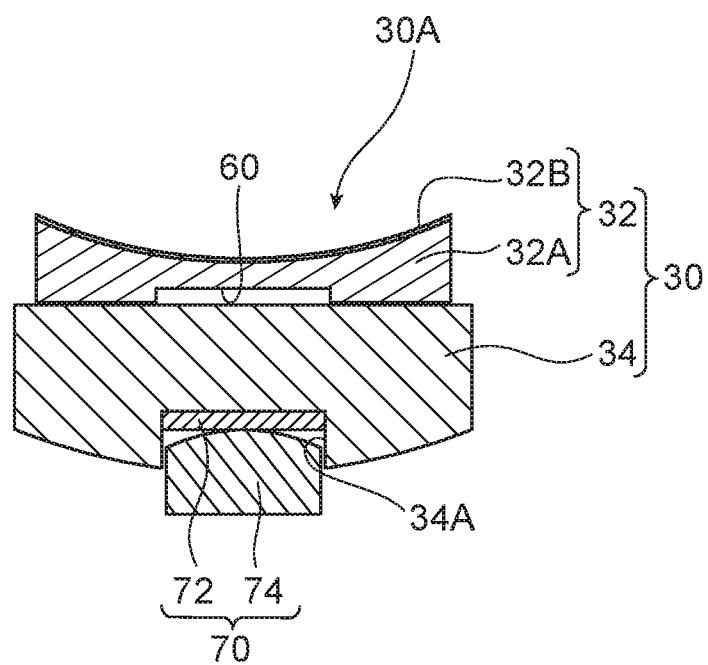
FIG. 3 is a partial enlarged view of a tilting-pad bearing according to an embodiment.

The bearing pad 30 for the tilting-pad bearing 10 according to an embodiment includes, for instance as shown in FIG. 3, a first member 32 having a bearing surface 30A and a second member 34 disposed on the back surface side of the first member 32.

In some embodiments, a plurality of bearing pads 30 may be disposed at different positions in the rotational direction S of the rotor shaft 2 on the inner peripheral side of the carrier ring 11 and may be configured to support the rotor shaft 2 from below.

The bearing pad 30 has, besides the bearing surface 30A as an inner peripheral surface facing the rotor shaft 2, an outer peripheral surface facing the carrier ring 11. The bearing surface 30A and the outer peripheral surface are curved with a curvature corresponding to the rotor shaft 2 in the circumferential direction.

In some embodiments, at least one of the back surface of the first member 32 or the front surface of the second member 34 facing the back surface of the first member 32 has a recess 60 for forming a cavity between the first member 32 and the second member 34. In some embodiments, for instance as shown in FIG. 3, the recess 60 may be formed in the back surface of the first member 32, i.e., a surface opposite to the bearing surface 30A of the first member 32 and facing the second member 34.

The recess 60 thus provided forms a cavity between the first member 32 and the second member 34, which allows a portion of the first member 32 adjacent to the cavity to bend and deform toward the second member 34, i.e., in a direction away from the rotor shaft 2 when load is applied to the bearing surface 30A. Thus, it is possible to suppress generation of a portion with higher local surface pressure than its periphery on the bearing surface 30A. Further, even if the portion with high local surface pressure is generated on the bearing surface 30A of the first member 32, it is possible to decrease a peak value of local surface pressure applied to the bearing surface 30A. Accordingly, especially at low-speed rotation, it is possible to reduce the increase in temperature due to friction between the rotor shaft 2 and the first member 32, and thus it is possible to prevent plastic flow on the bearing surface 30A.

Figure 4:
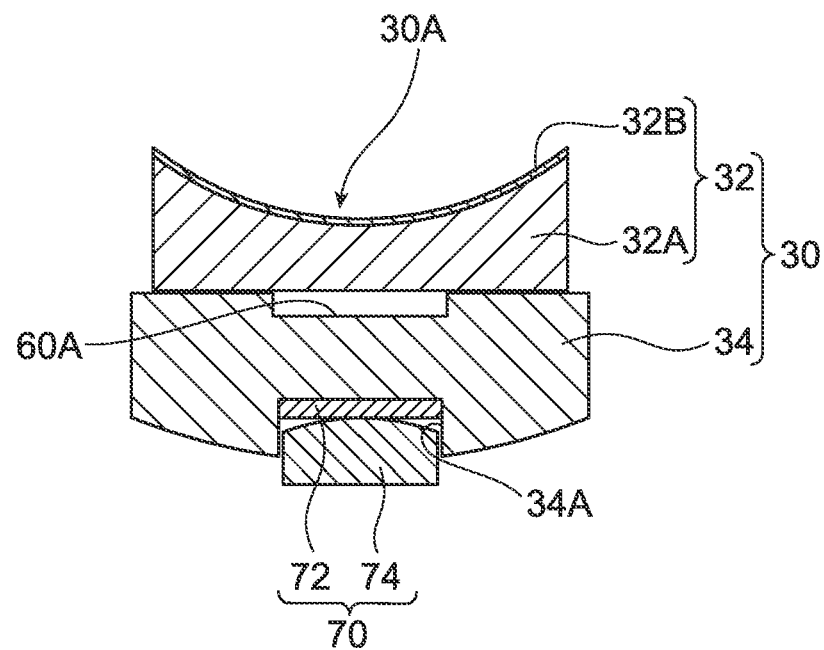
FIG. 4 is a partial enlarged view of a tilting-pad bearing according to another embodiment.
Figure 5:
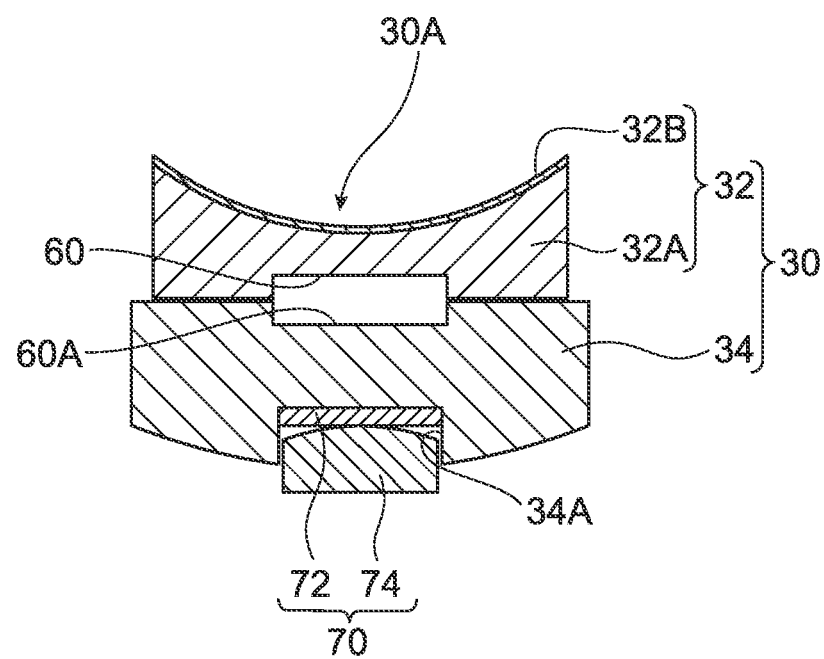
FIG. 5 is a partial enlarged view of a tilting-pad bearing according to another embodiment.

In another example, for instance as shown in FIG. 4, a recess 60A may be formed in the front surface of the second member 34, i.e., a surface of the second member 34 facing the first member 32. Alternatively, in another example, for instance as shown in FIG. 5, the recess 60 may be formed in the back surface of the first member 32, and the recess 60A may be formed in the front surface of the second member 34. When both the recess 60 and the recess 60A are provided, it is possible to obtain a large stroke (escape stroke) for the first member 32 to bend in a direction away from the rotor shaft 2.

In some embodiments, the second member 34 may be configured to be tiltable relative to the carrier ring 11. Thus, the bearing pad 30 including the second member 34 and the first member 32 is tiltably supported on the carrier ring 11. For instance, the curvature of the back surface of the second member 34 corresponding to the outer peripheral surface of the bearing pad 30 may be larger than the curvature of the inner peripheral surface of the carrier ring 11 facing the back surface.

In some embodiments, the bearing pad 30 may further include a support member 70 disposed on the back surface side of the second member 34 and tiltably supporting the first member 32 and the second member 34. In this case, one of facing surfaces of the second member 34 and the support member 70 in contact with each other may be flat and the other may be curved. Alternatively, both surfaces may be curved surfaces convex to each other. Further, in a case where the centers of curvatures of the members are on the same side with respect to their contact portion, one inscribed in the other may have a larger curvature than the other. Thus, the back surface of the second member 34 and the support member 70 may be in contact with each other in a tiltable manner.

In some embodiments, for instance as shown in FIGS. 3 to 5, the support member 70 may be disposed on the back surface side of the second member 34, and may include a projection 74 protruding toward the second member 34.

In some embodiments, the projection 74 may be configured to come into point contact with the second member 34. In this case, the projection 74 may be a so-called spherical pivot having a spherical surface to face the second member 34. In another embodiment, for instance, the projection 74 may be shaped so as to come into line contact with the second member 34, or may be shaped so as to come into surface contact with the second member 34.

In some embodiments, a recess 34A may be formed in the back surface of the second member 34, i.e., a radially outward facing surface of the second member 34 adjacent to the carrier ring 11, and at least a part of the projection 74 may be received in the recess 34A.

In some embodiments, the support member 70 may include a liner 72 disposed between the projection 74 and the second member 34. The liner 72 may be formed in a substantially flat shape, for instance. In some embodiments, the liner 72 is disposed so as to contact the bottom surface of the recess 34A, and the projection 74 may be disposed so as to tiltably support the first member 32 and the second member 34 via the liner 72.

In some embodiments, the recess 60 may be formed over at least a part of the installation range of the support member 70 in a plan view of the bearing pad 30. In other words, the recess 60 is not necessarily formed so as to cover the entire installation range of the support member 70 in a plan view of the bearing pad 30, and may be formed in a range smaller than the support member 70. In this case, the recess 60 may be formed in a range including the contact portion (contact point, contact line, or contact surface) of the projection 74 of the support member 70 and the second member 34 (or the liner 72) in a plan view of the bearing pad 30, as the "at least a part of the installation range of the support member 70".

Figure 6:
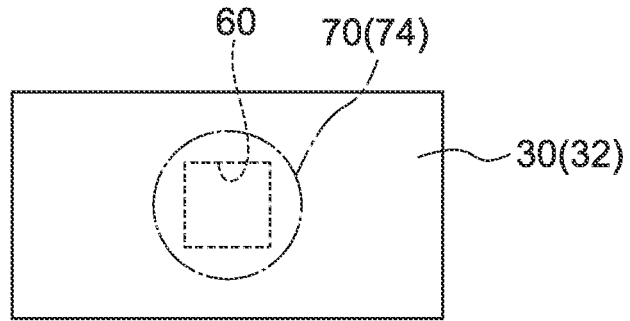
FIG. 6 is a partial enlarged view of a bearing pad according to an embodiment.

More specifically, as shown in FIG. 6, in a case where the projection 74 is for instance a spherical pivot, the recess 60 may be formed in a range including at least a part of the installation range of the support member 70 (specifically, projection 74) in a plan view of the bearing pad 30.

Here, the tiltable bearing pad 30 tends to have high local surface pressure at a portion on the bearing surface 30A whose back is supported by the support member 70. In this regard, if the recess 60 is formed over at least a part of the installation range of the support member 70 in a plan view of the bearing pad 30 as described above, at least a part of the portion with high surface pressure on the bearing surface 30A of the first member 32 can bend in a direction away from the rotor shaft 2. Thus, it is possible to relieve the surface pressure and prevent generation of the portion with higher local surface pressure than its periphery on the bearing surface 30A, or even if the portion with higher local surface pressure is generated, it is possible to decrease a peak value of the surface pressure. Accordingly, it is possible to reduce surface pressure applied to the bearing surface 30A and prevent plastic flow on the bearing surface 30A.

Figure 7:
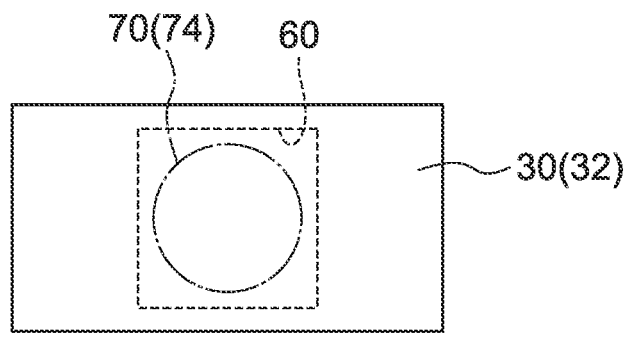
FIG. 7 is a diagram illustrating a modification of a bearing pad according to an embodiment.

In an embodiment, the recess 60 may be formed over the entire installation range of the support member 70 in a plan view of the bearing pad 30. For instance, as shown in FIG. 7, the recess 60 may be formed in a range larger than the installation range of the support member 70 and including the entire installation range of the support member 70 (specifically, projection 74) in a plan view of the bearing pad 30.

With the above configuration, in a plan view of the bearing pad 30, the recess 60 formed over the entire installation range of the support member 70 allows load applied to the bearing surface 30A and the support member 70 to be relieved reliably, thus preventing generation of the portion with higher local surface pressure than its periphery on the bearing surface 30A.

Figure 8:
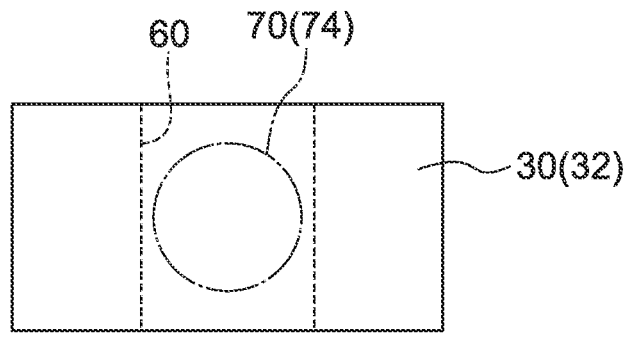
FIG. 8 is a diagram illustrating a modification of a bearing pad according to an embodiment.

In some embodiments, the cavity formed by the recess 60 may communicate with an external space of the bearing pad 30. For instance, as shown in FIG. 8, the recess 60 may be formed in a groove shape penetrating the bearing pad 30 along the axial direction of the rotor shaft 2. With this configuration, lubricant oil is accessible inside and outside the cavity formed by the recess 60. Thus, for instance, it is possible to give a damping function to the bearing pad 30 with respect to shaft vibration of the rotor shaft 2 input to the bearing pad 30 or the like.

In some embodiments, the recess 60 may be formed in a groove shape penetrating the bearing pad 30 in a direction perpendicular to both the axial direction and the radial direction of the rotor shaft 2.

The cross-sectional area of the communication portion (opening portion) between the bearing pad 30 and the external space thereof can be appropriately set in consideration of the damping performance with respect to shaft vibration or the like.

In some embodiments, the first member 32 may be made of copper, a copper alloy, or steel. Further, in some embodiments, the second member 34 may be made of steel.

The first member 32 includes a copper-based metal layer 32A made of copper or a copper alloy, and a white metal layer 32B formed on the inner peripheral side (inner side in the radial direction of the rotor shaft 2) of the copper-based metal layer 32A and forming the bearing surface 30A (see FIGS. 3 to 5, for instance). The second member 34 forms a steel layer of the bearing pad 30.

With this configuration, while the recess 60 prevents generation of the portion with higher local surface pressure than its periphery on the bearing surface 30A, the first member 32 made of copper or a copper alloy improves heat dissipation performance of the bearing pad 30 and prevents thermal deformation, and the second member 34 made of steel suppresses pressure deformation of the bearing pad 30. Thus, it is possible to more reliably prevent generation of the portion with higher local surface pressure than its periphery on the bearing surface 30A, or even if the portion with higher local surface pressure than the periphery is generated, it is possible to decrease a peak value of the surface pressure. Consequently, it is possible to prevent plastic flow on the bearing surface 30A. Further, since an allowable bearing load per oil film with the same thickness is increased at high-speed rotation with the increase in heat dissipation performance by copper, it is possible to downsize the tilting-pad bearing 10.

With the configuration in the embodiments disclosed above, it is possible to obtain the rotary machine 1 with the rotor shaft 2 supported by the tilting-pad bearing 10 capable of preventing plastic flow on the bearing surface 30A.

Second Embodiment

Next, a tilting-pad bearing 110 according to a second embodiment will be described. The same features as those in the rotary machine 1 according to the above-described embodiments are indicated by the same reference numerals and not described to avoid repetition of description.

Figure 9:
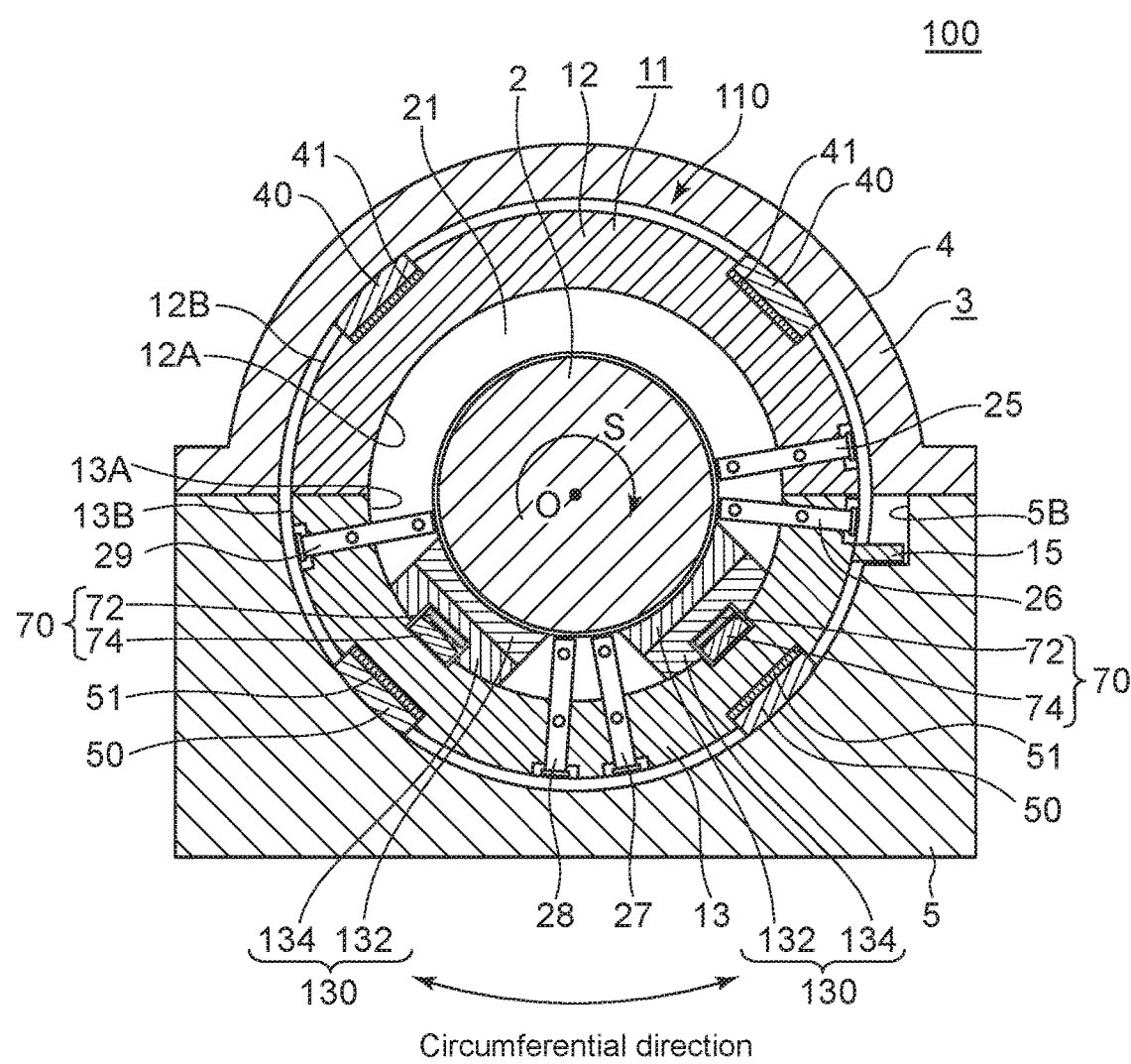
FIG. 9 is a cross-sectional view of a tilting-pad bearing according to a second embodiment, viewed from a direction perpendicular to the axial direction.
Figure 10:
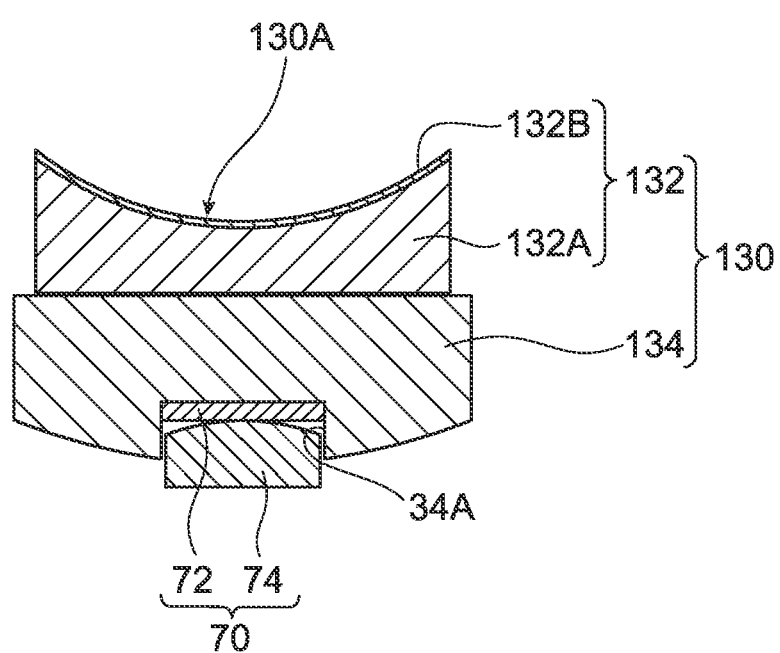
FIG. 10 is a cross-sectional view of a tilting-pad bearing according to the second embodiment, viewed from the axial direction.

FIG. 9 is a cross-sectional view of a tilting-pad bearing 110 according to a second embodiment, viewed from a direction perpendicular to the axial direction. FIG. 10 is a cross-sectional view of a tilting-pad bearing 110 according to the second embodiment, viewed from the axial direction.

As shown in FIGS. 9 and 10, the tilting-pad bearing 110 applied to a rotary machine 100 in the second embodiment is different from the above-described embodiments in that the recess 60 is not provided. Further, the tilting-pad bearing 110 according to the second embodiment is a journal bearing adopting a direct lubrication method as the lubrication method.

This tilting-pad bearing 110 includes at least one bearing pad 130 and a carrier ring 11 disposed on the outer peripheral side of the at least one bearing pad 130 and configured to hold the at least one bearing pad 130. The carrier ring 11 includes at least one (five in the present embodiment) oil-supply nozzle 25 to 29 for supplying lubricant oil to a bearing surface 130A.

For instance, as shown in FIGS. 9 and 10, each bearing pad 130 includes a first member 132 having a bearing surface 130A and made of copper, a copper alloy, or steel, and a second member 134 disposed on the back surface side of the first member 132 and made of steel.

The first member 132 includes a copper-based metal layer 132A made of copper or a copper alloy, and a white metal layer 132B formed on the inner peripheral side (inner side in the radial direction of the rotor shaft 2) of the copper-based metal layer 132A and forming the bearing surface 130A (see FIG. 10). The second member 134 forms a steel layer of the bearing pad 130.

With this configuration, the first member 132 made of copper or a copper alloy improves heat dissipation performance of the bearing pad 130 and reduces thermal deformation, and the second member 134 made of steel improves stiffness of the bearing pad 130 and suppresses pressure deformation. Accordingly, it is possible to reduce local surface pressure acting on the bearing surface 30A and prevent plastic flow on the bearing surface 130A at low-speed rotation. Further, since an allowable bearing load per oil film with the same thickness is increased at high-speed rotation with the increase in heat dissipation performance by the first member 132 made of copper or a copper alloy, it is possible to downsize the tilting-pad bearing 110.

The present invention is not limited to the embodiments described above, but includes modifications to the embodiments described above, and embodiments composed of combinations of those embodiments.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

The invention claimed is:

1. A bearing pad for a tilting-pad bearing, the bearing pad comprising:
   a first member having a bearing surface curved in an arcuate shape;
   a second member disposed on a back surface side of the first member; and
   a support member disposed on a back surface side of the second member and tiltably supporting the first member and the second member,
   wherein at least one of a back surface of the first member or a front surface of the second member facing the back surface of the first member has a recess for forming a cavity between the first member and the second member, and the recess is configured not to communicate with an external space of the bearing pad,
   wherein the first member is made of copper or a copper alloy, and
   wherein the second member is made of steel.

2. The bearing pad according to claim 1,
   wherein the recess is formed over at least a part of an installation range of the support member in a plan view of the bearing pad.

3. The bearing pad according to claim 2,
   wherein the recess is formed over an entirety of the installation range of the support member in the plan view of the bearing pad.

4. A tilting-pad bearing comprising:
   at least one bearing pad according to claim 1; and
   a carrier ring disposed on an outer peripheral side of the at least one bearing pad and configured to hold the at least one bearing pad.

5. A tilting-pad bearing comprising:
   at least one bearing pad; and
   a carrier ring disposed on an outer peripheral side of the at least one bearing pad and configured to hold the at least one bearing pad,
   wherein the at least one bearing pad includes:
      a first member having a bearing surface curved in an arcuate shape and made of copper or a copper alloy;
      a second member disposed on a back surface side of the first member and made of steel; and
      a support member disposed on a back surface side of the second member and tiltably supporting the first member and the second member,
   wherein at least one of a back surface of the first member or a front surface of the second member facing the back surface of the first member has a recess for forming a cavity between the first member and the second member, and the recess is configured not to communicate with an external space of the bearing pad, and
   wherein the carrier ring includes at least one oil-supply nozzle for supplying lubricant oil to the bearing surface.

6. A rotary machine comprising:
the tilting-pad bearing according to claim 4; and
a rotor shaft rotatably supported by the tilting-pad bearing.

* * * * *